No. 764,442. Patented July 5, 1904.

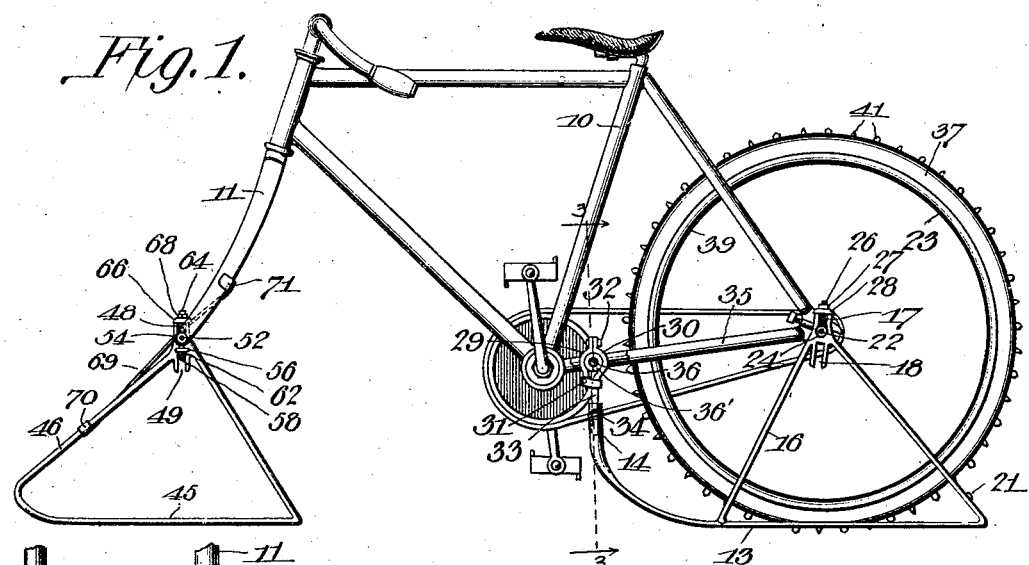

UNITED STATES PATENT OFFICE.

AXEL ERICKSON AND NICKLARS LARSON, OF SKANEE, MICHIGAN.

SLED-RUNNER ATTACHMENT FOR BICYCLES.

SPECIFICATION forming part of Letters Patent No. 764,442, dated July 5, 1904.

Application filed March 4, 1904. Serial No. 196,600. (No model.)

*To all whom it may concern:*

Be it known that we, AXEL ERICKSON and NICKLARS LARSON, citizens of the United States, residing at Skanee, in the county of Baraga and State of Michigan, have invented a new and useful Sled-Runner Attachment for Bicycles, of which the following is a specification.

This invention relates to sled-runner attachments to bicycles to transform the same into an ice or snow bicycle, and has for its object to simplify and improve the construction and produce a device of this character which may be attached to any of the bicycle-frames in common use and adjustable to adapt it to different sizes of such machines.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a side elevation of a bicycle of approved form with the improvement attached. Fig. 2 is a front elevation of the forward wheel-fork detached with the forward runner member in position thereon. Fig. 3 is a front elevation of the runner with the bicycle-frame in section on the line 3 3 of Fig. 1. Fig. 4 is a transverse section, and Fig. 5 is a longitudinal section, enlarged, of the tire portion of the device.

The improved attachments may be applied to any of the bicycle-frames in common use by slight and immaterial modifications and for the purpose of illustration is shown applied to an ordinary form of such a frame having the main frame 10 and forward wheel-fork member 11, the ordinary forward wheel being removed from the frame, as it is not employed in the present invention. The rear portion of the frame is provided with a runner formed with spaced members 12 13 for running on the snow or ice and with the forward ends upturned and united in a substantially vertical socket 14. The side members 12 13 are also provided with side standards 15 16, converging at the upper ends and having upwardly-opening slots 17, downwardly-opening slots 18, and with transverse rear brace 21, all the parts of the runner being forged or welded together to increase the strength and cheapen the construction. The slots 17 18 are to receive the outer ends of the axle 22 of the rear wheel 23, the latter having a special form of tire to be hereinafter described. The ordinary clamp-nuts 24 of the rear axle will be utilized to clamp the runner member in position by bearing upon the material of the runner adjacent to the slots, and surrounding the axle between the frame 10 and the runner member are collars 25, having threaded studs 26 extending therefrom and provided with a nut 27 and stop 28, supported upon the extremities of the arms forming the side walls of the slots. By this simple means it will be obvious that the axle may be adjusted in the slots 17 18 to any required extent and clamped in the adjusted position by "setting up" the clamp-nuts 24. By providing two sets of the slots, as 17 18, the runner-frame may be adapted to wheels of various diameters, as hereinafter more fully described.

Attached to the frame 10 in advance of the wheel 23 is a clip formed of two parts 29 30, hinged together at 31 at one side and clamped together at the other side, as by clamp-screw 32. The clip member is provided with a depending stud 33 for slidable engagement with the socket 14, in which it is adjustably supported, as by set-screw 34. The divided clip member is for connection to the lower brace member 35 of the frame 10 and may be clamped to the most convenient portion of the frame. In bicycle-frames having a transverse brace 36 between the two side portions of the lower brace member, which is a common construction, and in frames wherein the lower brace member has no transverse brace, which is also a common construction, the clip will be rotated one-fourth of a revolution and attached to the longitudinal portion of the frame relatively in the same position, the clip member being readily attachable in either position, as will be obvious. To provide for the attachment of the clip to different sizes of frame members, a plurality of divided ferrules or segmental spacer members 36′ of assorted sizes will be provided, so that the device may be quickly adapted to different makes of bicycle-frames.

The wheel 23 will be provided with a tire having spaced spurs to engage the snow or ice and operative between the spaced runner members, and it is essential that the spurs engage the snow or ice with just the proper grip. Hence the importance of providing for the exact vertical adjustment. By the means shown it is obvious that the wheel may be adjusted to any degree within the range of the vertical slots, and by using the two sets of slots the runners may be adapted to a wide range of sizes of wheels and an extensive variety in the shape and styles of the frames. The tire of the rear wheel is of the ordinary inflatable form, comprising the outer casing 37, connected, as by lacing, and cemented in the ordinary manner in the concave rim 39 and having the internal inflatable tube 40.

At suitable intervals spurs 41 are connected to the casing member 37, each spur having a stud 42 extending through the member 37 and secured in position by riveting against a washer 43, inside the same. The spaced washers are covered and prevented from coming in contact with the inflatable tube 40 by a guard-strip 44, of suitable material, such as rubber.

The spurs 41 and their studs 42, together with the washers 43, are of metal, preferably of steel, and the spurs will all preferably be alternately acute and obtuse in form, as shown, or each alternate spur relatively sharp and the remaining spurs relatively dull or blunt. The sharper spurs will penetrate the snow or ice more readily and insure the requisite grip, and the duller spurs will engage the same and offer the requisite resistance to prevent slipping and by their greater strength will also prevent breakage when the strains are applied.

The runner for the forward part of the bicycle-frame is similar to the rear runner, differing only in minor details made necessary to adapt it to the fork member 11. The forward runner is composed of a single ground-bearing member 45, connected by standards 46 47 to a double set of reversely-disposed open slots 48 49, similar to the like slots in the rear runner and for the same purpose. The forward wheel is removed and a bar 52 substituted for its axle and provided with clamp-nuts 53 54, by which the runner may be clamped in position with its slots engaging the bar 52 in substantially the same manner as the rear runner is secured to the rear axle. The forward runner-standards are provided with apertured lugs 55 56 to receive threaded studs 57 58, depending from collars 59 60, engaging the bar 52, and provided with nuts 61 62, bearing beneath the lugs 55 56. The collars 59 60 are also provided with threaded studs 63 64, extending from the sides opposite to the studs 57 58 and provided with guide-stops 65 66, bearing on the side members forming the walls of the slots and having nuts 67 68 bearing on the stops. By this arrangement it is obvious that the bar 52 may be adjusted to any desired extent within the range of the slots 48 or 49, as the case may be, and thus adapt the forward runner to correspond to any adjustment of the rear runner to maintain the frame 10 in proper horizontal position.

A spring 69 is connected between the arms of the fork 11 and the forward members of the standards 46 47 by clips 70 71 at its ends to yieldably support the forward runner and cause it to adapt itself to any irregularities in the surface of the road, and thus prevent jars or concussions being imparted to the frame 10 or the rider carried thereon.

The whole device is very simple and compact and can be easily applied to any of the various forms of bicycle-frames in common use by substituting the bar 52 for the axle of the forward wheel and the spurred tire for the ordinary tire and connecting and adjusting the runners, as above described. With a bicycle thus equipped a rider can travel over well-beaten snow-covered roads with great speed and ease and without jarring or concussion arising from any irregularities in the surface traveled over.

Having thus described the invention, what is claimed is—

1. A sled-runner having means for adjustable connection to the rear axle of a bicycle and with an upturned forward end terminating in a socket, a clip for detachable connection to the bicycle-frame in advance of the drive-wheel and provided with a stud for slidable engagement with said runner-socket, and means for adjustably clamping said stud within said socket.

2. A sled-runner having means for adjustable connection to the rear axle of a bicycle and with an upturned forward end terminating in a socket, a divided clip for removably clamping upon the bicycle-frame and having a stud for slidable engagement with said socket, and clamping means for adjustably connecting said stud and socket.

3. A sled-runner having spaced bearing members provided with means for detachable connection to the rear axle of a bicycle with the drive-wheel operating between the said spaced members, said spaced members united at their forward ends and terminating in a socket, a collar for detachable connection with a bicycle-frame in advance of said drive-wheel and having a stud for slidable engagement with said socket, and a set-screw for clamping said stud adjustably in said socket.

4. A sled-runner for bicycles having upwardly and downwardly extending open slots spaced apart by the body portion of the runner-frame for alternate reception of an axle supported upon the bicycle-frame, and means reversible from one slot to the other for adjustably supporting said axle in either of said slots.

5. A sled-runner for bicycles having upper and lower spaced slots which are open at their upper and lower ends respectively for the alternate reception of an axle, a collar for the reception of an axle and provided with a substantially radial outwardly-directed screw-threaded stud, the collar being movable from one to the other of the slots and reversible to locate its stud in either of the slots, and a nut carried by the stud for engagement with the frame of the runner at the outer end of either slot.

6. A sled-runner for bicycles having a slot for receiving an axle supported upon a bicycle-frame and with a perforated lateral lug adjacent to said slot, a collar for engaging the axle and having oppositely-extended threaded studs with one of said studs extending through said lug, and nuts upon said studs and bearing respectively upon said lug and the runner-frame exteriorly of said slot.

7. A sled-runner for bicycles having upwardly and downwardly extending open slots spaced apart by the body portion of the runner-frame for alternate engagement with an axle supported upon the bicycle-frame and with a perforated lateral lug between the slots, a collar for engaging the axle and having oppositely-extending threaded studs with one of said studs for extending through said apertured lug, and nuts for bearing alternately upon opposite sides of said lug and of the runner exteriorly of said slots.

8. In a bicycle, the fork-arm of the forward wheel having a transverse bar supported therein in place of the forward axle, a sled-runner having slots for engaging said bar, means for adjustably connecting said runner upon said bar, and a spring bearing upon said fork-arm and upon said runner to yieldably maintain the runner in operative position.

9. A sled-runner having means for adjustable connection to the rear axle of a bicycle and with an upturned forward end, a clip for detachable coupling to the bicycle-frame in advance of the drive-wheel, means for adjustably connecting said clip to said runner, and divided collars for insertion between said clip and bicycle-frame, whereby the clip may be adapted to different sizes of frame members.

In testimony that we claim the foregoing as our own we have hereto affixed our signatures in the presence of two witnesses.

AXEL ERICKSON.
NICKLARS LARSON.

Witnesses:
ADOLPH MELIN,
GUST DAHLBERG.